A. J. HODGE & H. B. RUGGLES.
PULP MOLDING MACHINE.
APPLICATION FILED JAN. 6, 1915.

1,278,466.

Patented Sept. 10, 1918.
7 SHEETS—SHEET 1.

Witnesses
T. P. Britt
R. Stanton

Inventor
A. J. Hodge
H. B. Ruggles
By Wm N Bates
Attorney

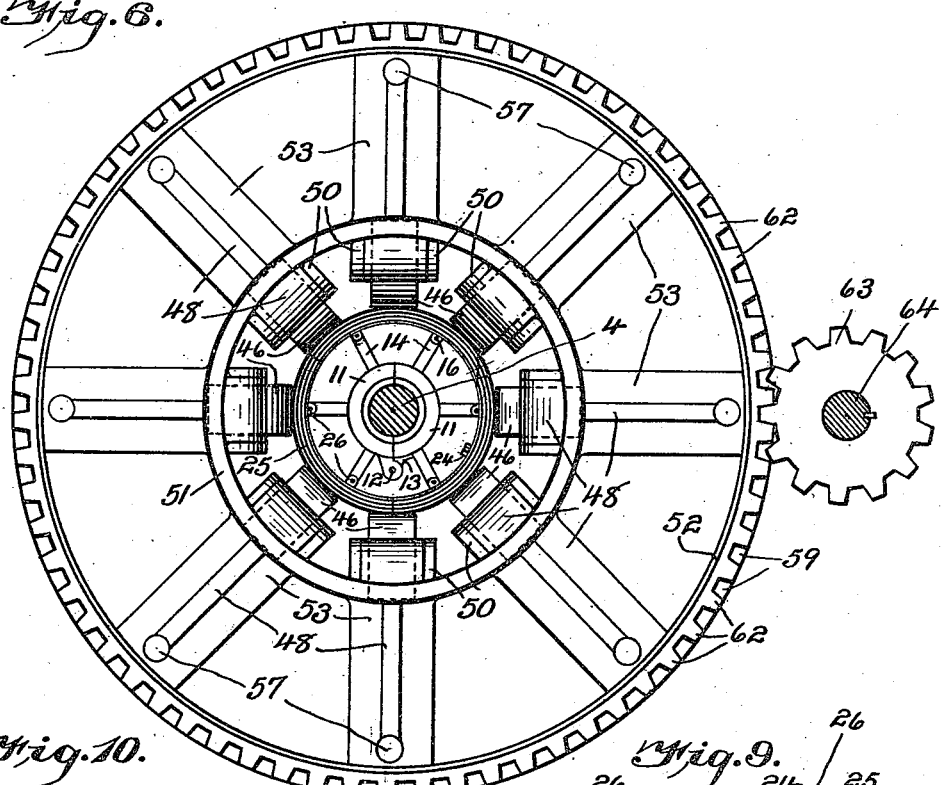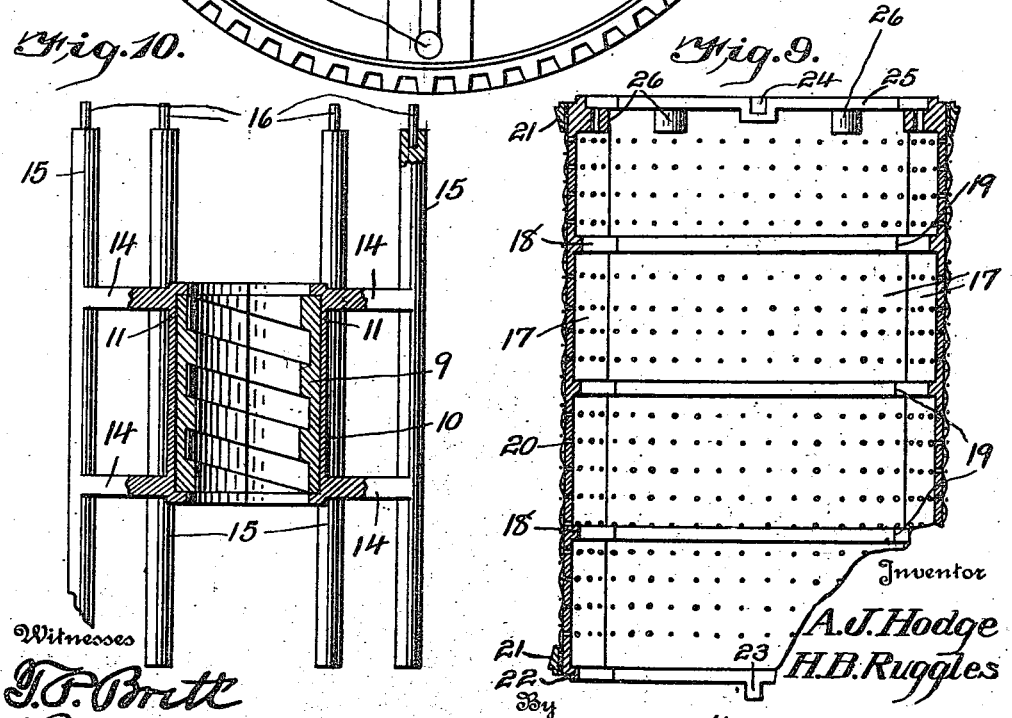

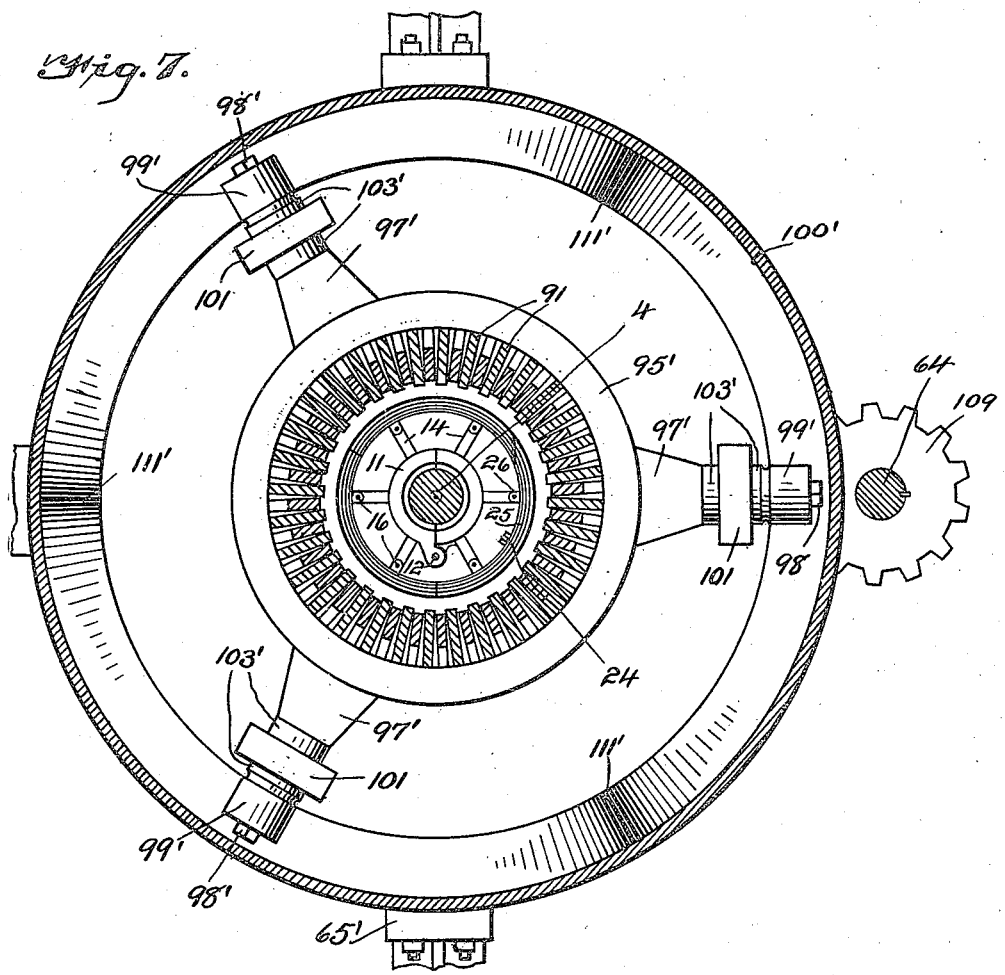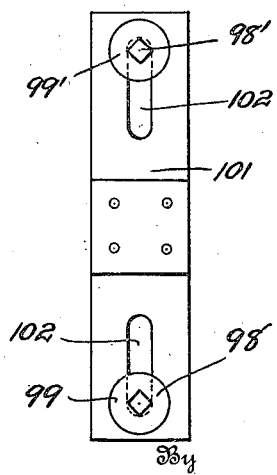

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY, OF ST. LOUIS, MISSOURI.

PULP-MOLDING MACHINE.

1,278,466.

Specification of Letters Patent.

Patented Sept. 10, 1918.

Application filed January 6, 1915. Serial No. 741.

*To all whom it may concern:*

Be it known that we, ARTHUR J. HODGE and HENRY B. RUGGLES, citizens of the United States of America, residing at Pasadena, in the county of Los Angeles and State of California, have invented certain new and useful Improvements in Pulp-Molding Machines, of which the following is a specification.

Our invention has relation to certain new and useful improvements in machines for producing cylindrical and other shaped structures from pulp or other analogous substances, and the primary object is the provision of a machine which will be of such construction and operation as to be capable of producing structures of the above mentioned character from pulp expeditiously and with but little labor and inconvenience on the part of the operator.

The invention has for another object, the provision of a machine of this character by means of which cylindrical or other shaped structures may be formed from pulp by attracting the same to a spirally rotating and gathering sectional former moving longitudinally through the pulp, then compressing the pulp gathered around the sectional former and finally shaping the compressed pulp and drying the same upon said sectional former.

Another object of our invention is the provision in a machine of this character, of mechanism which will effectually serve to force all liquid from the pulp and thoroughly dry the latter during the formation of the structure.

A further object of our invention is the provision in a pulp machine, of a spirally movable sectional former, around the outer face of which the pulp is gathered and compressed and thoroughly dried in the form of a cylinder of the desired size, to be severed into cylindrical or other shaped structures as the pulp cylinder is discharged from the machine.

A further object of our invention resides in the provision of a machine of the aforesaid character, which will be constructed and will operate in such manner as to afford a continuous run of output.

A still further object of our invention resides in the provision of a sectional former through which may readily pass the water or other fluid from the pulp, as the latter is compressed and squeezed around the outer surface of the sectional former.

With these and other objects in view, our invention consists in the novel construction and combination of parts as will be hereinafter more in detail described and the asserted novelty specifically pointed out in the claims.

In the accompanying drawings which clearly and fully illustrate our invention:—

Fig. 6 is a transverse horizontal section on the line 6—6 of Fig. 3, looking in the direction indicated by the arrow;

Fig. 7 is a transverse horizontal section on the line 7—7 of Fig. 4, looking in the direction indicated by the arrow;

Fig. 8 is a detail elevation of one of the double slotted connecting plates;

Fig. 9 is a detail vertical longitudinal section of the outer cylinder of one of the former-sections;

Fig. 10 is a longitudinal vertical section through the two-part inner skeleton frame of one of the former-sections and the feed and guide nut therefor;

Figure 1:
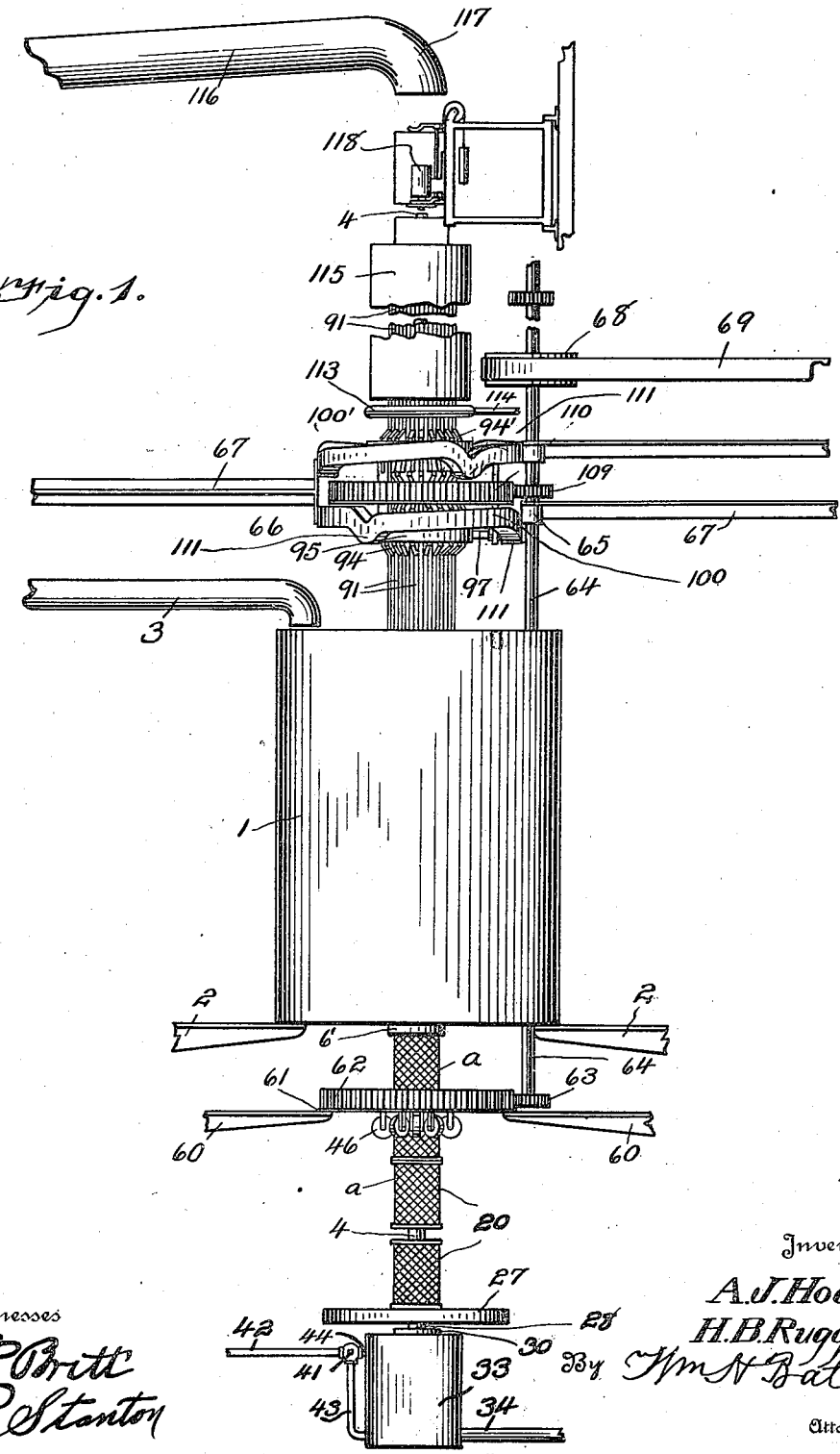
Figure 1 represents a side elevation of the machine according to our invention, ready for use.

Referring more particularly to the drawings in which similar reference characters designate corresponding parts throughout the several views, 1 designates a pulp containing tank which is supported in elevated position by bracket arms 2 or any other suitable means.

The pulp containing tank 1 receives a continuous supply of fine pulp from a feed pipe 3 having its discharge end directed toward the open upper end of said pulp containing tank 1.

Extending through the longitudinal center of the pulp containing tank 1 is the stationary central shaft 4 of the machine, the bottom of the pulp containing tank 1 being provided with a central opening 5, through which the stationary central shaft 4 extends.

Around and spaced from the stationary central shaft 4 and secured in the central opening 5 is the selfclosing upwardly flared pulp receiving and directing receptacle 6, which has a depending downwardly flared lower end 6' projecting through said opening 5, and an outwardly directed annular flange 7 extending from the narrow portion of said pulp receiving and directing receptacle 6 and secured in any suitable manner upon the upper face of said bottom of the pulp containing tank 1.

Formed upon a portion of the stationary central shaft 4 below the pulp containing tank 1, is a spirally extended feed and guide thread 8 for feeding and guiding upwardly in a spiral direction the former-sections A. Two-part feed and guide nuts 9 are positioned in the registering sockets 10 formed in the center of each of the longitudinal halves 11 of the two-part inner skeleton frame of each former-section A and are adapted for engagement with and movement upwardly over the feed and guide thread 8, to be fed and guided upwardly in a spiral direction around the stationary central shaft 4 and through the pulp containing tank 1 by said thread 8. Each former-section A comprises a two-part inner skeleton frame and a two-part outer cylinder, which will now be described in detail.

Figure 11:
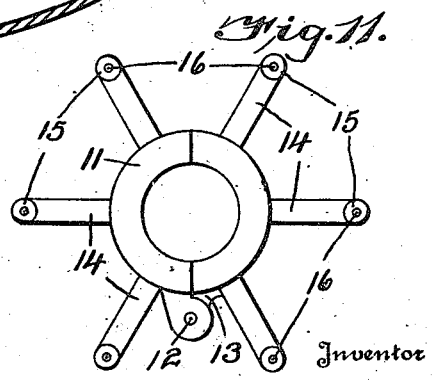
Fig. 11 is a top plan view of the same.

The longitudinal halves 11 of the two-part inner skeleton frame are connected together by a hinge pin 12 extended through the overlapped ears 13 projecting from adjacent longitudinal edges of said halves. (See Fig. 11). Projecting radially from the center of the longitudinal halves 11 of the inner skeleton frame are the upper and lower arms 14, the outer ends of which connect with the vertical rods 15, arranged preferably in a circle and having locking pins 16 removably engaged in their upper extremities, the purpose of which will presently be apparent. Each two-part inner skeleton frame is adapted for removable engagement in one of the sectional outer cylinders to complete one of the former-sections A.

Each sectional outer cylinder includes a plurality of (preferably three) longitudinal arcuate castings 17 of perforated aluminum or any other suitable metal and having formed on their inner faces the spaced sectional reinforcing ribs 18, the free ends 19 of which preferably have abutting engagement with one another, as shown in Fig. 9.

Positioned around the outer faces of the castings 17 is a screen 20 formed of wire mesh or the like. Chine and head channel forming hoop sections 21 are located around the outer faces of the arcuate castings 17, at the upper and lower edges thereof, outwardly of the screen 20, and secured to said arcuate castings 17 to retain said screen 20 in position. Inner lower ring sections 22 are formed upon the inner faces of the arcuate sections 17 at the lower ends thereof. One of the lower inner ring sections 22 is provided with a depending locking lug 23 for engagement in a locking slot 24 in the upper face of one of the inner upper ring sections 25 of a lower former-section A, when two or more former-sections are connected together around the stationary central shaft 4. The inner upper ring sections 25 of each former-section A are formed with the arcuate castings 17 of the outer cylinder thereof, at the upper ends of the same and have depending lugs 26 arranged in a circular series and directed toward the longitudinal center of said outer cylinder and provided with central apertures to receive the locking pins 16 in the upper ends of the rods 15 and thereby securely hold the inner skeleton frame against movement within the outer cylinder, the lower ends of the rods 15 resting upon the inner lower ring sections 22. It will be understood that separation of the two-part inner skeleton frame within the outer cylinder will be prevented by positioning the inner skeleton frame so that the locking pins 16 engaged in the rods 15 adjacent the free ends of the halves of said inner skeleton frame will be extended through lugs 26 carried by only one of the inner upper ring sections 25.

Figure 12:
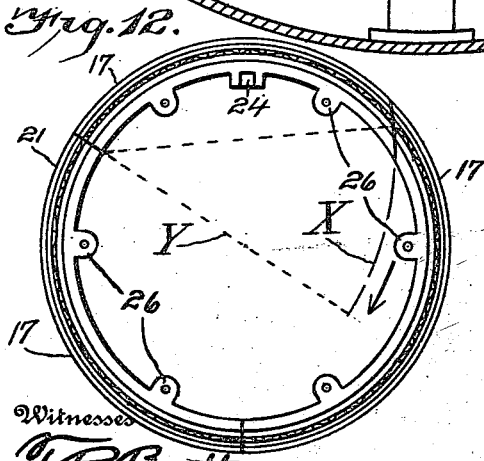
Fig. 12 is a top plan view of the parts shown in Fig. 9.

By referring to Fig. 12, in which the outer cylinder of one of the former-sections A with the parts carried thereby is shown in top plan, it will be noted that the casting upon which is formed the inner upper ring section carrying the locking slot 24, has one longitudinal edge cut at an oblique angle and engaged against the correspondingly cut longitudinal edge of one of the outer castings, so that after the locking pins 16 have been removed and the inner skeleton frame turned and withdrawn from the outer cylinder, the first mentioned casting may be swung inwardly along the line X as indicated by the arrow in this figure, until said casting has its obliquely cut longitudinal edge about at the point of intersection of the line X with the dotted line Y. The remaining castings may then be swung inwardly and all of said castings 17 withdrawn from the structure formed around the same.

From the foregoing paragraph it will be seen that the former-sections A may be readily withdrawn from within any structure formed around the same by compressing the pulp or the like around the outer cylinders, by unlocking the inner skeleton frames and withdrawing the same and then collapsing the outer cylinders as above described.

The former-sections A are secured around the lower portion of the stationary central shaft 4 in proper order, by the operator standing upon the elevating platform 27, encircling said stationary central shaft 4 and mounted upon the upper end of the hollow piston rod 28. The hydraulic piston 29 is threaded upon the hollow piston rod 28, adjacent the lower end thereof, and snugly engaged in the hydraulic cylinder 30. The hydraulic cylinder 30 has its lower end secured in a cylinder receiving socket 31 positioned centrally upon the bottom 32 of the waste water receiving tank 33, from the lower portion of which projects the waste water discharge pipe 34.

The elevating platform 27 must be raised to elevate each new former-section A placed around the shaft 4 and resting in the seat 35 formed in the inner edge of the ring-shaped supporting table 36 positioned in the downwardly offset center 37 of said elevating platform 27 and resting upon the bearing balls 38 in the registering runways 39 and 40 of the elevating platform 27 and the supporting table 36, respectively. Hydraulic pressure is employed for elevating the supporting table 36 and elevating platform 27 and a three-way valve 41 of conventional form is located at the junction of the main hydraulic pressure supply pipe 42 with the branches 43 and 44 thereof. When the valve 41 is in one position, the water under pressure from the main hydraulic pressure supply pipe 42 will be conducted by the branch pipe 43, to the lower end of the hydraulic cylinder 30, below the hydraulic piston 29, to force the latter upwardly in said hydraulic cylinder 30 and thereby elevate the elevating platform 27 and the supporting table 36. The lower end 45 of the branch pipe 43 is extended inwardly through the waste water receiving tank 33 and secured in the hydraulic cylinder 30, while the branch pipe 44 is simply extended into the tank 33.

The elevating platform 27 and supporting table 36 must be elevated a sufficient distance to force the new former-section A into locking engagement with the other former-section or former-sections above the same, with the inner upper ring 25 of the new or lower former-section engaged over the depending lug 23 of the inner lower ring 22 of the former-section immediately above said new or lower former-section and also present the feed and guide nut 9 of said new or lower former-section to the lower end of the feed and guide thread 8.

As soon as the nut 9 of the new or lower former-section catches upon the lower end of the feed and guide thread 8, the valve 41 is turned to close the main hydraulic pressure supply pipe 42 and connect the branch pipes 43 and 44 and thereby permit the elevating platform 27 and supporting table 36 to again return to their lowermost or normal positions, the pressure upon the lower face of the hydraulic piston 29 being relieved by the escapement of the water from beneath the same and within the branch pipe 43, by way of the branch pipe 44, to the tank 33, to be carried off by the waste water discharge pipe 34. The supporting table 36 is then ready to receive the next former-section A to be elevated and locked with the other former-section or former-sections above the same for an upward spiral movement around the feed and guide thread 8 and portion of the stationary central shaft 4 above said feed and guide thread 8. Of course the former-sections A must be opened as they are placed around the stationary central shaft 4 and upon the supporting table 36, after which they are again securely closed.

The first former-section A or former-sections A must be rotated manually upon the lower portion of the stationary central shaft 4 and the feed and guide thread 8 only until the first former-section A is caught by the sectional former rotating rollers 46 and rotated upwardly between the same in a spiral direction, which rollers 46 are arranged in a circular series around the stationary central shaft 4, below the pulp containing tank 1. The first former-section A forces the sectional former rotating rollers 46 outwardly and causes them to bind against the outer face of the screen 20 thereof and rotate said former-section A upon the feed and guide thread 8, together with all former-sections A locked for rotation with said first former-section A. The sectional former rotating rollers 46 engage the former-sections A in turn as the same move upwardly between said sectional former rotating rollers 46, thereby assuring a steady upward spiral movement of the sectional former through the pulp receiving and directing receptacle 6 and pulp containing tank 1, at a predetermined rate of speed.

The sectional former rotating rollers 46 are mounted upon short shafts 47, journaled in the forked depending arms of the bell-crank levers 48 which in turn are enlarged at the junction of their depending and horizontal arms and pivoted upon short pivot shafts 49, journaled in the pairs of ears 50 projecting from the inner face of the hub 51 of the large gear wheel 52. The hub 51 is connected with the rim of the large gear wheel 52 by the radially directed flat spokes 53, above which extend the horizontal arms of the bell-crank levers 48, after passing through transverse openings 54 provided therefor in said hub 51. The free ends of the horizontal arms of the bell-crank levers 48 are slidably engaged upon the guide pins 55 which are engaged through the outer ends of the spokes 53. Helical tension springs 56 are mounted upon the guide pins 55 between the heads 57 thereof and the horizontal arms of the bell-crank levers 48, to exert a resilient downward pressure upon said arms and thereby retain the sectional former rotating rollers 46 in binding engagement with the screens 20 of the former-sections A. The pressure of the sectional former rotating rollers 46 against the screens 20 may be readily regulated by rotation of the nuts 58 upon the lower ends of the guide pins 55 and bearing upon the underside of the spokes 53, to adjust the tension of the helical springs 56.

The large gear wheel 52 has a lower outwardly directed annular flange 59 which rests upon the free ends of supporting bracket arms 60 below the supporting bracket arms 2 and provided with upstanding centering lugs 61, to center the large gear wheel 52 and prevent outward movement of the same in any direction.

Engaged with the peripheral gear teeth 62 of the gear wheel 52 to rotate the same, is a pinion 63, mounted upon the lower end of the vertical drive shaft 64 of the machine, which drive shaft extends upwardly through the pulp containing tank 1, adjacent one side thereof and parallel with the stationary central shaft 4, the drive shaft 64 being continued for some distance above said pulp containing tank 1 and journaled in a bearing 65 carried by a supporting frame 66 mounted upon bracket arms 67. The drive shaft 64 carries a pulley wheel 68 around which is engaged a drive belt 69 for imparting rotary movement to said drive shaft 64 from any suitable motor, not shown.

Owing to the outer diameter of the former-sections A being only slightly less than the interior diameter of the narrowest portion of the selfclosing pulp gathering and directing receptacle 6, it will be practically impossible for the pulp within the tank to pass through said receptacle. The contents of the pulp containing tank 1 will continually move toward the center and bottom of the same and over the upper edge of the pulp gathering and directing receptacle 6, keeping the latter filled at all times and causing the flared wall of said pulp gathering and directing receptacle 6 to direct the pulp to the outer faces of the screens 20 of the former-sections A, as the connected former-sections A move spirally through said pulp gathering and directing receptacle 6 and the pulp containing tank 1, the pulp being drawn toward and adhering to the outer faces of said screens 20, while the water passes through said screens 20 and arcuate castings 17 and falls down through the center of the sectional former to the hydraulic cylinder 30, which projects above and overflows into the waste water tank 33.

After passing through the pulp gathering and directing receptacle 6, the connected former-sections pass through an irregular supporting ring 70 spaced above the pulp gathering and directing receptacle 6 and supported by a spacing arm 71 projecting upwardly from one side of said pulp gathering and directing receptacle 6 and secured to the upper face of said irregular supporting ring 70. This ring 70 has a flange 72 projecting outwardly from its upper edge.

Opposite halves of the irregular supporting ring 70 and flange 72 are offset from one another and the opposite ends of the offset halves of said irregular supporting ring 70 are connected by parallel angular connecting ring portions. The main portions of the flange 72, over the offset halves of the irregular supporting ring 70, are oppositely inclined longitudinally to provide opposite long gradually inclined track sections. The upper end of each long gradually inclined track section is connected with the offset lower end of the opposite long gradually inclined track section by a short steep inclined track section 73, connecting the main portions of said flange 72 and extending at an abrupt angle to the same.

Resting upon the flange 72, are the lower ends of the upstanding primary compressor and squeezer bars 74 which are spaced slightly from one another and resting upon the lower ends of the long gradually inclined track sections. The long gradually inclined track sections are also arranged eccentrically with respect to the stationary central shaft 4 and the former-sections A are surrounded by the primary compressor and squeezer bars 74 as said former-sections A travel upwardly in a spiral direction upon the portion of the stationary central shaft 4 within the pulp containing tank 1.

Each upstanding compressor and squeezer bar 74 has pivoted therein a short distance from its opposite ends, the inner arms 75 of upper and lower toggles which have their outer arms 76 pivoted to ears 77 projecting from the inner faces of the upper and lower gear rings 78 positioned around said compressor and squeezer bars 74 and provided with peripheral gear teeth 79, with which are engaged the drive pinions 80 mounted upon the drive shaft 64.

The upper and lower gear rings 78 have outwardly directed lower annular flanges 81 which rest upon the supporting arms 82 directed inwardly from the inner faces of the upstanding flanges 83 of the supporting frames 84, secured to the inner face of the pulp containing tank 1, as shown at 85, and the supporting frames 84 are provided with suitable bearings 86, through which the drive shaft 64 is loosely journaled.

Displacement of the gear rings 78 is prevented by the upstanding flanges 83, previously mentioned, which prevent outward movement of the gear rings 78, thereby assuring proper rotation of the latter upon the supporting arms 82, upon rotation of the drive shaft 64.

Secured to the underface of the outer arm 76 of each toggle and projecting beyond the same, is a semicircular cam block 87. The lower curved or cam face of the cam blocks 87 carried by the upper and lower toggles, respectively, ride upon the upper faces of the upper and lower double continuous cam tracks 88, secured in the center of the upper and lower supporting frames 84 and spaced from the outer faces of the compressor and squeezer bars 74. The upper and lower double continuous cam tracks 88 are preferably formed of angle iron and the inclined portions of the upper faces therein correspond with the inclined portions of the upper face of the flange 72 of the ring 70, so that as the gear rings 78 rotate, the toggles move in and out or close and open, thereby forcing inwardly and drawing outwardly the compressor and squeezer bars 74 as they are moved around the sectional former to compress and squeeze the pulp against the screens 20.

The highest as well as the lowest portions of the flange 72 and the upper and lower double continuous cam tracks 88 are diametrically opposite so that when one compressor and squeezer bar 74 is in its uppermost and innermost position, the diametrically opposite compressor and squeezer bar 74 is also in its uppermost and innermost position, thereby exerting an even inward pressure upon the pulp gathered around the sectional former at opposite points thereof. Owing to the continual rotation of the sectional former while passing through the series of primary compressor and squeezer bars 74, a uniform pressure will be exerted upon all portions of the pulp cylinder formed around said sectional former, by said compressor and squeezer bars 74.

The compressor and squeezer bars 74 move inwardly and upwardly gradually as said compressor and squeezer bars ride upon the flange 72, until they reach their innermost and uppermost positions, the toggles gradually opening or straightening out during the upward and inward movement of said compressor and squeezer bars 74. After each compressor and squeezer bar 74 reaches its uppermost and innermost position and exerts an inward pressure upon the pulp gathered against the portion of the sectional former directly opposite said compressor and squeezer bar 74 to thoroughly compress said pulp and squeeze all water or other liquid from the same, said compressor and squeezer bar 74 rides downwardly and outwardly upon the adjacent short steeply inclined track section 73, until said compressor and squeezer bar 74 is again in its lowermost and outermost position. This movement of each compressor and squeezer bar 74 is repeated on the remaining half of the flange 72, thereby causing said compressor and squeezer bar 74 to describe a substantial or irregular cycle upon each complete revolution of the large gear rings 78. The toggles connected with the compressor and squeezer bars 74 close automatically as the cam blocks 87 carried thereby ride downwardly and outwardly upon the short steeply inclined portions or track sections of the cam tracks 88.

The movement of the operative parts hereinbefore described is so timed as to cause the adjacent compressor and squeezer bars 74 to engage and press against overlapping portions of the pulp gathered around the former-sections A, thereby eliminating danger of forming seams in the pulp cylinder as it is formed by compressing the pulp against the screens 20 and pressing the water or other liquid from said pulp. A large portion of the water or liquid pressed or squeezed from the pulp during the formation of the pulp cylinder, will pass through the screens 20 and arcuate castings 17 to the interior of the sectional former. It will be apparent that the upward spiral movement of the sectional former within the series of compressor and squeezer bars 74 and the movement of said compressor and squeezer bars 74 and also the operating mechanism for said compressor and squeezer bars 74 below the pulp line or level B (near the upper end of the pulp containing tank 1 and slightly below the upper ends of said compressor and squeezer bars 74) will serve to agitate the pulp and to create a suction and draw the pulp toward the sectional former and through the spaces between the compressor and squeezer bars 74, when the latter are separated, to be compressed and squeezed by said compressor and squeezer bars 74 against the screens 20 as said compressor and squeezer bars 74 again close together and move inwardly and upwardly.

After the former-sections A pass above the compressor and squeezer bars 74, they pass through a supporting ring 89 suspended from the inner free ends of the inwardly directed bracket arms 90 secured to the inner face of the pulp containing tank 1, adjacent the upper edge thereof, and said former-sections A then pass spirally through the circular series of longitudinal secondary or final compressor and squeezer bars 91, the lower ends of which rest upon the upper face of the supporting ring 89. The final compressor and squeezer bars 91 serve to give the final compression to the pulp cylinder and squeeze from the same any water or liquid remaining therein and said final compressor and squeezer bars 91 also serve to shape the pulp cylinder.

It will be understood that the final compressor and squeezer bars 91 and also the primary compressor and squeezer bars 74 may be of spiral form or any other preferred form, instead of straight or vertical, as shown. It will further be evident that the construction of the former sections A may be readily varied for forming other shaped structures from the pulp and the primary and secondary compressor and squeezer bars 74 and 91, respectively, arranged accordingly to engage and compress the pulp against the outer face of the sectional former and squeeze the liquid from the same.

Alternate compressor and squeezer bars of the series of secondary or final compressor and squeezer bars 91 have lower wedge blocks 92 secured on their outer faces with the outer faces 93 of said wedge blocks 92 inclined and upper and lower stop lips 94 extended outwardly beyond said inclined outer faces 93.

A lower ring 95 is engaged around the inclined outer faces 93 of said lower wedge blocks 92 and has its inner wall 96 inclined to correspond with the inclination of said outer faces 93 and vertical movement of the ring 95 upon said lower wedge blocks 92 is limited by said upper and lower stop lips 94.

The remaining or intermediate bars 91 are provided above the lower wedge blocks 92, with upper wedge blocks 92' which are secured to the outer faces of the last mentioned bars 91 and have inclined outer faces 93' with the outwardly projecting stop lips 94' at the upper and lower ends of said inclined outer faces 93'. The upper wedge blocks 92' are similar in form to the lower wedge blocks 92 and have engaged therearound an upper ring 95' similar to the lower ring 95.

The lower ring 95 and upper ring 95' are adapted for vertical movement upon the inclined faces 93 and 93' of the wedge blocks 92 and 92' respectively. The lower ring 95 and upper ring 95' have radially directed arms 97 and 97', respectively, with reduced outer ends 98 and 98', upon which are mounted guide rollers 99 and 99', engaged in the lower and upper continuous runways 100 and 100' formed of channel iron or the like and mounted in the supporting frame 65, previously mentioned. The lower and upper rings 95 and 95', respectively, are arranged with the arms 97' of the upper ring 95' above the arms 97 of the lower ring 95 and the corresponding arms 97 and 97' are connected by the vertical double slotted connecting plates 101 provided in their opposite ends with elongated longitudinal slots 102 through which the reduced outer ends 98 and 98' of said arms 97 and 97' are engaged, movement of the plates 101 in a direction longitudinally of the arms 97 and 97' being prevented by washers 103 and 103' mounted upon the reduced outer ends 98 and 98' of said arms 97 and 97', to opposite sides of said plates 101.

The vertical connecting plates 101 are secured at their longitudinal centers, by suitable securing members 104, to the inner face of the gear ring 105, between the lower and upper continuous runways 100 and 100' and resting upon the horizontal arms 106 of the supporting frame 65. The gear ring 105 has a lower outwardly directed annular flange 107 engaging the lugs 108 formed on the upper face of said horizontal arms 106 and serving to center the gear ring 105 and prevent upward movement of the same.

The gear ring 105 is rotated by the drive pinion 109 mounted upon the drive shaft 64 and engaged with the peripheral gear teeth 110 of said gear ring 105, to carry the rollers 99 and 99' around the wedge blocks 92 and 92' of the secondary or final compressor and squeezer bars 91. During the rotation of the gear ring 105 and rings 95 and 95', the rollers 99 and 99' on the lower and upper arms 97 and 97', respectively, will be compelled to ride in the depressed or curvilinear portions 111 and 111' of the runways 100 and 100' a number of times during each complete revolution of said gear rings 105 and 105' and rings 95 and 95', the depressed or curvilinear portions 111 and 111' of the runways 100 and 100' corresponding in number to the number of rollers 99 and 99' engaged in said continuous runways 100 and 100'. The depressed or curvilinear portions 111' of the upper runway 100' are offset from the depressed or curvilinear portions 111 of the lower runway 100, whereby the upper ring 95' will be rotating in its uppermost position to press inwardly the upper wedge blocks 92' and secondary or final compressor and squeezer bars 91 by which said upper wedge blocks 92' are carried, when the upper rollers 97' are in the upper or main portions of the continuous upper runway 100' and the lower rollers 97 are in the depressed or curvilinear portions 111 of the lower continuous runway 100, to rotate the lower ring 95 around the lower portions of the lower wedge blocks 92 and thereby release the compressor and squeezer bars 91 by which said lower wedge blocks 92 are carried and permit the last mentioned compressor and squeezer bars 91 to move outwardly. As the upper ring 95' is moved to its lowermost position, the lower ring 95 is moved to its uppermost position and viceversa, the two sets of secondary or final compressor and squeezer bars 91 alternately and thoroughly compressing and squeezing the pulp cylinder and shaping the same around the sectional former as the latter passes upwardly in a spiral direction through the series of final compressor and squeezer bars 91 and around the stationary central shaft 4 inclosed by said series of secondary or final compressor and squeezer bars 91. The pulp cylinder is thoroughly dried just before leaving the secondary or final compressor or squeezer bars 91 by hot air or the like escaping from the discharge openings 112 in the inner side of the continuous hot air directing pipe 113 encircling said compressor and squeezer bars 91 adjacent the upper ends thereof, the hot air being directed between the bars 91 as they move outwardly, and against the outer face of the pulp cylinder around the sectional former. The continuous pipe 113 is connected with and supported by the hot air feed pipe 114. Above the hot air directing pipe 113 and spaced outwardly of the upper ends of the secondary or final compressor and squeezer bars 91, is the hot air flue 115, through which the hot air may travel upwardly after being directed against the pulp cylinder by the pipe 113, thereby preventing the hot air from escaping to the surrounding atmosphere until after it passes the upper extremity of the secondary or final compressor and squeezer bars 91 and serves its purpose of heating and thoroughly drying the pulp cylinder around the sectional former.

To further assure thorough heating and drying of the pulp cylinder as it is formed and shaped around the sectional former, hot air is directed to the interior of the sectional former by the upper hot air directing pipe 116, which has its free end 117 curved downwardly above the upper end of the stationary central shaft 4, to direct hot air downwardly around said stationary central shaft 4 and within the former-sections A, to heat and dry the inner face of the pulp cylinder by heating the arcuate castings 17 and passing through the perforations of the same.

The pulp cylinder may be severed in sections as it is discharged from the upper end of the machine and the former sections A leave the upper extremity of the stationary central shaft 4, by suitable severing mechanism 118, between the upper end of said stationary central shaft 4 and the free end 117 of the hot air distributing pipe 116.

Figure 2:
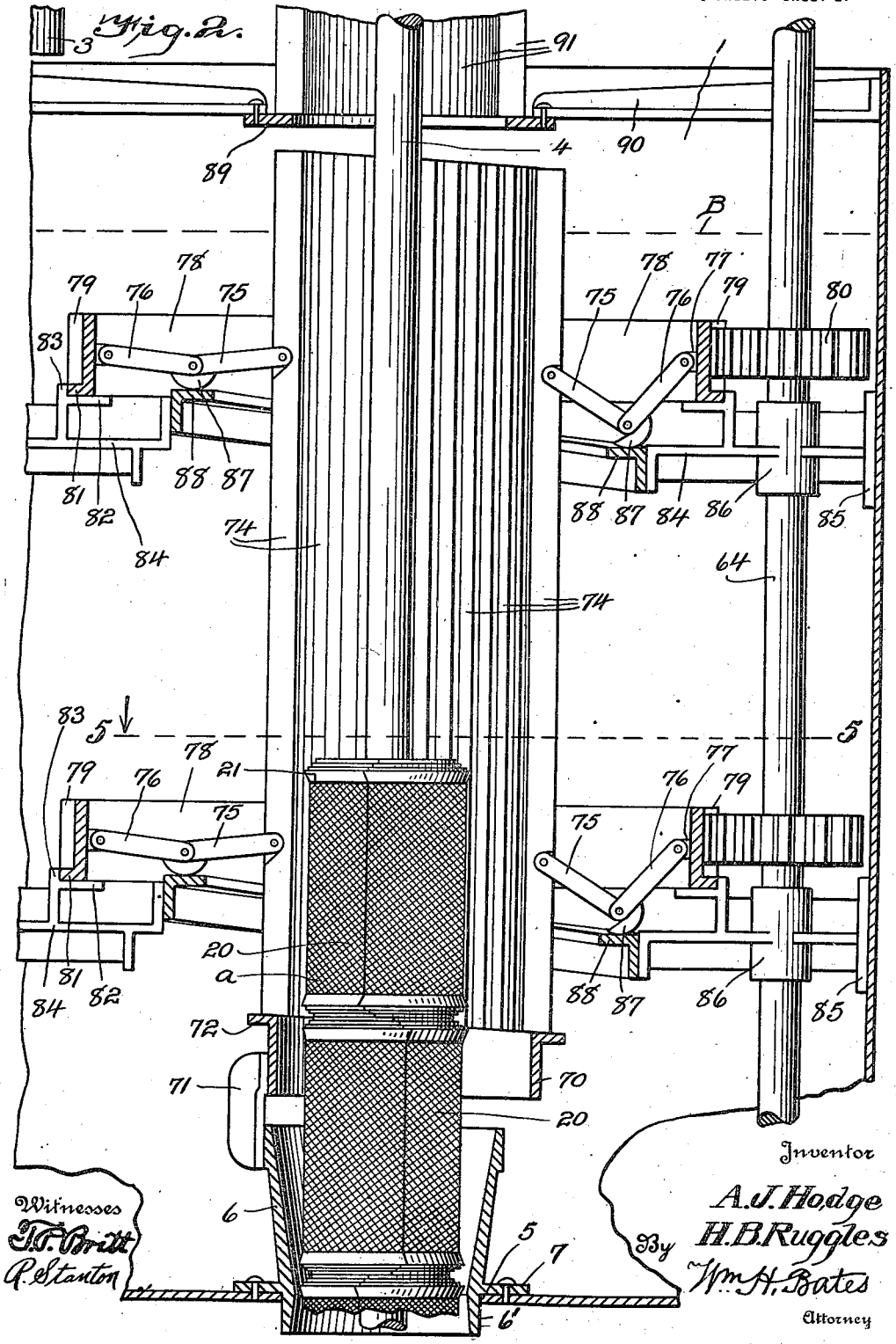
Fig. 2 is an enlarged fragmentary vertical longitudinal section through the pulp containing tank, with parts positioned therein shown in elevation.
Figure 3:
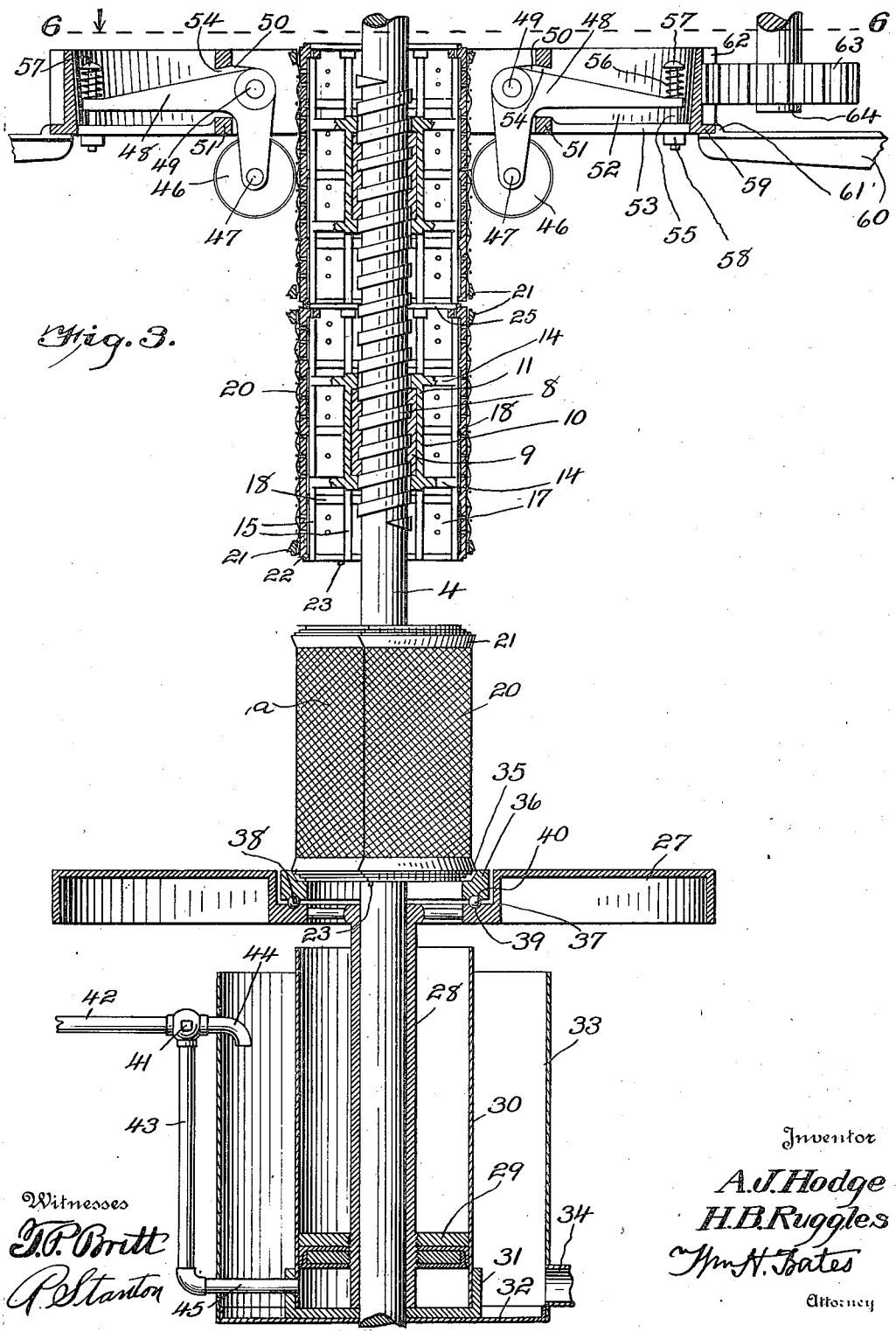
Fig. 3 is an enlarged vertical longitudinal section of the lower portion of the machine, with parts shown in elevation.

From the foregoing description taken in connection with the accompanying drawings, the operation of the machine will be obvious, but may be briefly rehearsed herein, as follows:—The pulp containing tank 1 is supplied with a fine pulp by the pulp feed pipe 3 so that the pulp level in the pulp containing tank 1 is always at about the pulp level line B, shown in Fig. 2, slightly below the upper ends of the primary compressor and squeezer bars 74. The former-sections A are placed upon the supporting table 36 by the operator stationed upon the elevating platform 27, and the supporting table 36 and elevating platform 27 raised by hydraulic pressure upon proper operation of the valve 41, to elevate each former-section A secured around the stationary shaft 4 and resting upon said supporting table 36, until said former-section A engages and locks with the former-section A immediately above the same and rotates with this last mentioned former-section A until the new or lower former-section A catches upon the feed and guide thread 8 of the stationary central shaft 4. The valve 41 is then operated to permit the supporting table 36 and elevating platform 27 to again return to their normal or lowermost positions to receive and elevate the next former-section A. This operation is continued and the connected former-sections A travel upwardly in a spiral direction around the stationary central shaft 4, between the sectional former revolving rollers 46, and upwardly through the pulp gathering and directing receptacle 6 and the series of primary compressor and squeezer bars 74 within the pulp containing tank 1 and finally through the series of secondary or final compressor and squeezer bars 91.

As the connected and traveling former-sections A pass upwardly through the pulp gathering and directing receptacle 6, the ring 70 and the series of primary compressor and squeezer bars 74, the pulp in the pulp containing tank 1 moves toward and gathers around the outer faces of the screens 20 of the former-sections A and is compressed against said screens 20 in the form of a cylinder, practically all of the water being pressed or squeezed from the pulp and a large amount of the water passing through the screens 20 and arcuate castings 17 and downwardly in the center of the former-sections A to the hydraulic cylinder 30 to overflow from the same into the waste water tank 33 to be carried off by the waste water discharge pipe 34. Some of the pulp also passes to the former-sections A by way of the spaces between the primary compressor and squeezer bars 74, as the same separate during each of their outward and downward movements, and all of the pulp reaching the former-sections A is tightly packed against the same during the continuous operation of the primary compressor and squeezer bars 74 upon the pulp, as previously described.

After the connected former-sections A with the compressed and squeezed pulp packed or compressed therearound in the form of a cylinder, pass out of the upper end of the series of primary compressor and squeezer bars 74, they enter and pass in an upward spiral direction through the series of secondary or final compressor and squeezer bars 91 to finally compress and squeeze and also shape the pulp while still revolving around the stationary central shaft 4 with the connected sections of the former. The finished pulp cylinder is also dried by the hot air directed against the inner and outer faces thereof as it passes through the series of final compressor and squeezer bars 91, as just described, and then severed into tubes or other cylindrical structures as it leaves the machine.

As the mechanism for operating the primary compressor and squeezer bars 74 and also the mechanism for operating the secondary or final compressor and squeezer bars 91, as well as the mechanism for operating the sectional former revolving rollers 46 is operatively connected with the drive shaft 64 to be driven by the same, the rotation of the sectional former and the movement of the series of compressor and squeezer bars 74 and 91 are so timed as to cause adjacent bars of said series 74 and 91 to compress overlapping portions of the pulp cylinder formed around the sectional former and thereby provide a smooth outer surface for the pulp cylinder and avoid the formation of longitudinal seams in the same.

Figure 4:
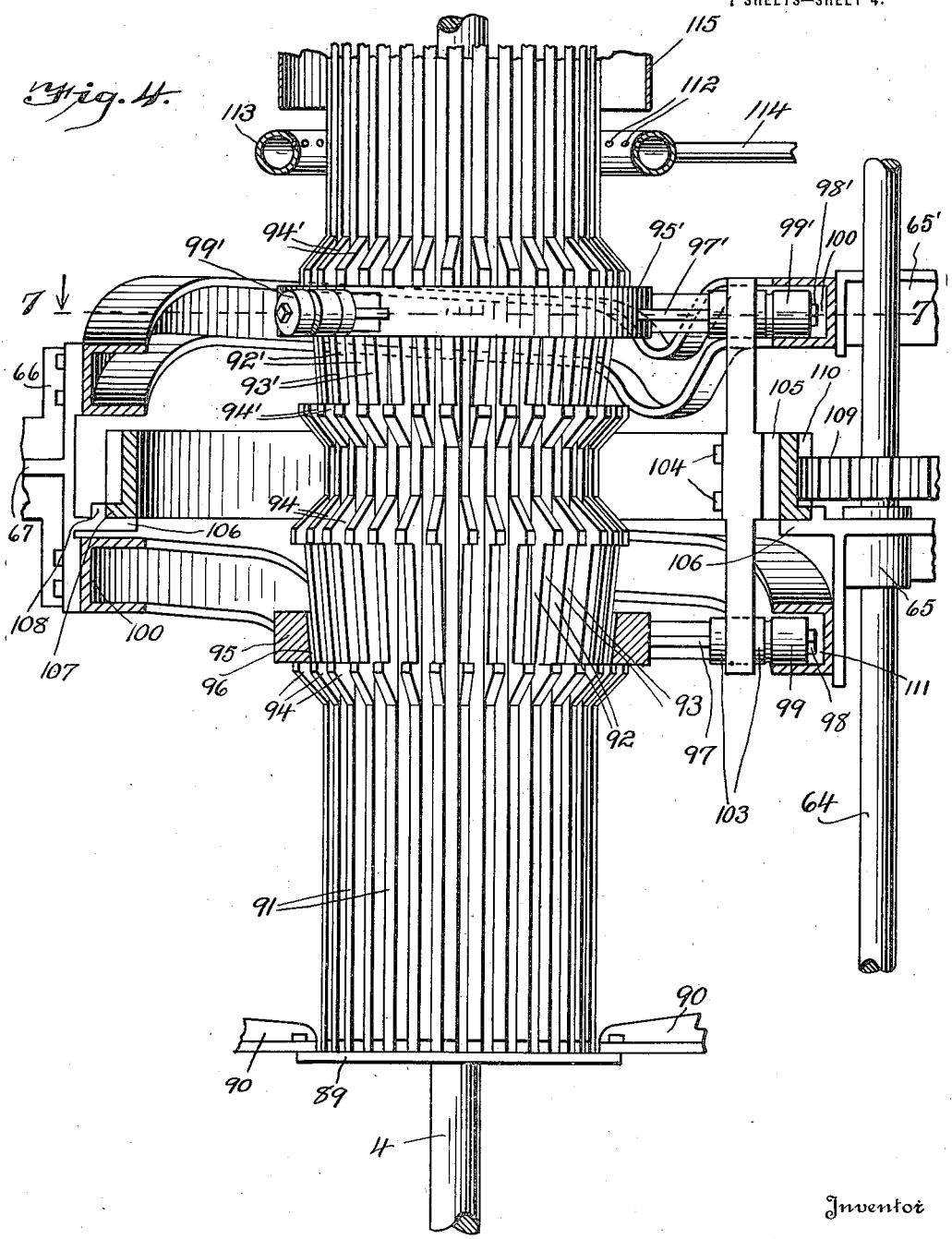
Fig. 4 is an enlarged elevation of the secondary compressing mechanism of the machine with some of the parts broken away and some shown in section.
Figure 5:
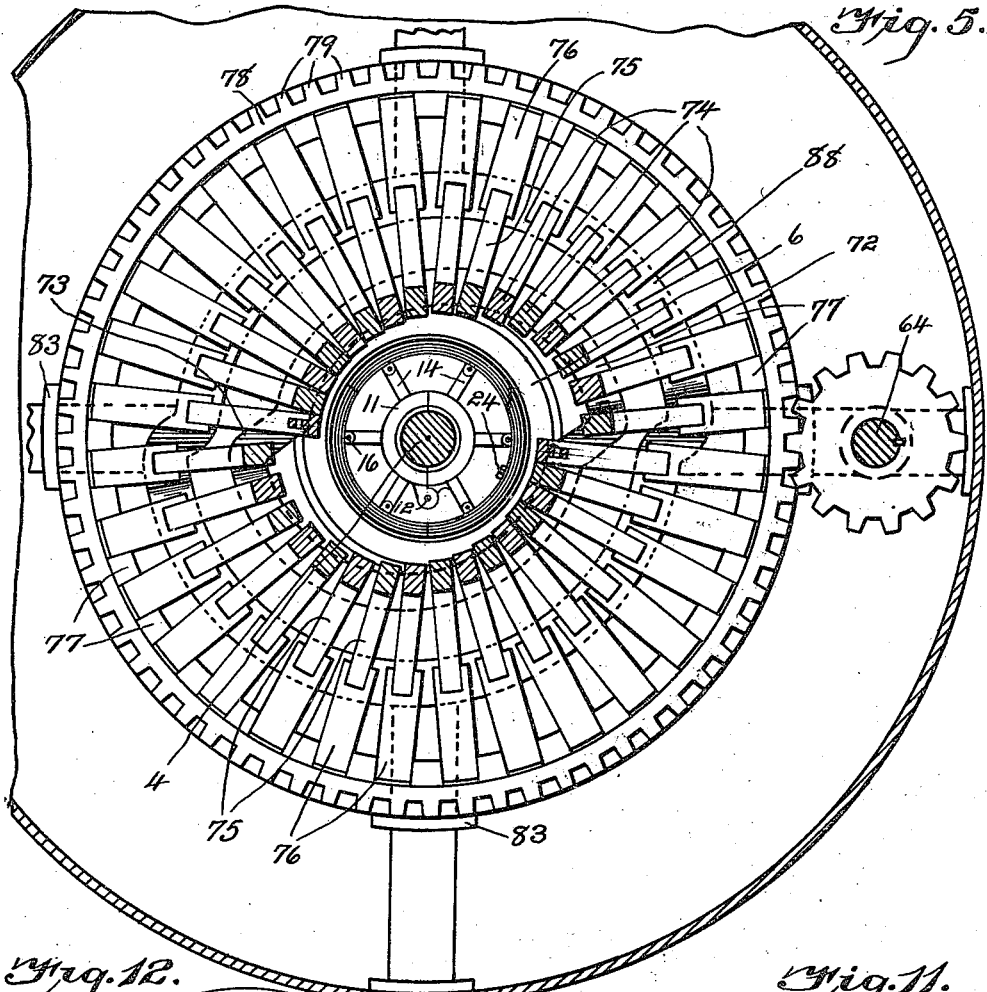
Fig. 5 is a transverse horizontal section on line 5—5 of Fig. 2, looking in the direction indicated by the arrow.

It will be understood that as alternate bars 91 are moved inwardly, they are also moved upwardly, as clearly shown in Fig. 4, the rings 95 and 95' raising the bars 91 by engagement with the upper stop lips 94 and 94' respectively and upward pressure against said stop lips 94 and 94'. The bars 91 are forced downwardly to their original or normal positions as they again move outwardly upon downward movement of the rings 95 and 95', said bars 91 being forced downwardly by engagement of the rings 95 and 95' with the lower stop lips 94 and 94' to exert a downward pressure upon the latter.

When making large cylinders of pulp it may be desirable to have more than two sets of primary compressor bars, while for very small cylinders, only one set may be necessary. This, however, is optional. It will also be evident that the pulp can reach the former-sections A from underneath as well as by rushing through between the bars and when running very coarse pulp fibers, it may be desirable to deliver the same directly between the former-sections A and the primary compressor and squeezer bars 74 at either the top or bottom of the latter or both, through a pressure pipe or other means.

While the preferred embodiment of the invention has been described and illustrated, various changes in the form, proportion and minor details of construction which fall within the scope of the appended claims, may be resorted to without departing from the spirit and scope of the invention or sacrificing any of the advantages of the same.

Having thus described our invention what we claim as new and desire to secure by Letters Patent, is:—

1. In a machine of the class described, the combination of a pulp containing tank, a pulp gathering former movable in a spiral direction through said pulp containing tank, supporting and guiding means for said pulp gathering former, and means for compressing the pulp gathered by said pulp gathering former around the latter.

2. In a machine of the class described, the combination of a pulp containing tank, a pulp gathering former movable spirally in an upward direction through said pulp containing tank, said pulp gathering former being adapted to gather pulp upon its outer face during its movement through said pulp containing tank, a stationary shaft extended through said pulp containing tank, said pulp gathering former being mounted upon said stationary shaft, and means for compressing around the pulp gathering former the pulp gathered by the latter.

3. In a machine of the class described, the combination of a pulp containing tank, a sectional pulp gathering former movable in one direction through said pulp containing tank to gather pulp upon its outer face from said pulp containing tank, means for supporting and guiding said sectional pulp gathering former, means for causing movement of said sectional pulp gathering former upon the supporting and guiding means provided for the same, and means for compressing the pulp gathered by the sectional pulp gathering former around the latter as it moves through said pulp containing tank.

4. In a machine of the class described, the combination of a pulp containing tank, a central shaft extended through said pulp containing tank, a pulp gathering former mounted upon said shaft and movable spirally through said pulp containing tank to agitate the contents of said pulp containing tank and draw the same to the outer face of said pulp gathering former, means for moving said pulp gathering former through said tank and toward the upper end of said shaft, and means for compressing the gathered pulp upon the former to produce a pulp structure.

5. In a machine of the class described, the combination of a pulp containing tank, a stationary central shaft extended through said pulp containing tank, a sectional former, means for rotating the sectional former in a spiral direction upon the shaft and through the tank to create a suction and draw the pulp within the tank to the outer face of the rotating former, a series of compressor and squeezer bars arranged around said shaft and sectional former, means for operating the diametrically opposite bars of said series in consecutive order to force the same against the pulp drawn to the outer face of said sectional former to compress said pulp around the latter in cylindrical form and squeeze the fluid from the pulp, and means for shaping the compressed pulp around said sectional former.

6. In a machine of the class described, the combination of a pulp containing tank, a stationary shaft extended through said pulp containing tank, a pulp gathering former movable upwardly in a spiral direction upon said stationary shaft to gather pulp from within said pulp containing tank, upstanding compressor bars within said pulp containing tank and around said pulp gathering former for compressing the pulp gathered upon said former, a track for said upstanding compressor bars, means for operating the compressor bars upon said track, secondary compressor bars above the first mentioned compressor bars for further compressing and shaping the pulp upon the pulp gathering former, means for operating the secondary compressor bars, and means for directing a drying fluid to the pulp gathered and compressed upon said former to dry said pulp.

7. In a machine of the class described, the combination of a pulp containing tank, a stationary central shaft extended through said pulp containing tank, a sectional former, the sections of said former being adapted to be separately engaged upon said shaft and locked together, said shaft having a guide thread located on a portion thereof below said pulp containing tank, means for moving said sections of the former to position to be engaged by said guide thread, means for locking together said sections, means for engaging said locked together sections in turn and rotating the same upon said guide thread to cause said locked together sections to move upwardly around said stationary central shaft and through said pulp containing tank, means for guiding pulp from the tank to the outer faces of said sections, and means for compressing the pulp against said outer faces of said sections to produce a pulp structure.

8. In a machine of the class described, the combination of a pulp containing tank, a pulp gathering and directing receptacle in the bottom of said tank, a series of inwardly and upwardly movable pulp compressor bars within said tank, a central shaft extended through the series of compressor bars and through said receptacle, a sectional former adapted for movement longitudinally of and rotation centrally around said central shaft, said sectional former passing through said receptacle and through the series of compressor bars, said former being adapted to receive pulp gathered in said receptacle and directed by the same to said former, and means for forcing said series of bars inwardly and upwardly against the pulp gathered upon said former.

9. In a machine of the class described, the combination of a pulp containing tank, a stationary shaft extended through said pulp containing tank, a guide thread upon a portion of said stationary shaft, a former constructed in sections, a platform beneath said pulp containing tank and slidable upon said stationary shaft, a table upon said platform to support a former-section, said platform and table being adapted to be forced upwardly by hydraulic pressure to elevate and engage the several sections of the former with said guide thread as each section is placed in position upon said table, means for locking together said sections when elevated, and means for rotating the connected sections and forcing the same upwardly upon and around the stationary shaft through said tank to gather pulp from the latter around the outer faces of said sections to be compressed around said former to provide a pulp structure.

10. In a machine of the class described, a pulp containing tank and a stationary central shaft extended through the same; in combination with a pulp gathering former movable spirally upon said shaft toward the upper end of the latter, a series of compressor bars around said shaft and pulp gathering former, a supporting track for said series of compressor bars, the lower ends of said compressor bars resting upon said supporting track, gear rings positioned outwardly of said series of compressor bars, cam tracks within said gear rings, separate connections between said gear rings and each bar of said series, and cam blocks carried by said connections and adapted to ride upon said cam tracks to force inwardly and upwardly the diametrically opposite bars of said series in consecutive order during rotation of said gear rings.

11. In a machine of the class described, the combination with a pulp containing tank, a stationary shaft extended through said tank, a series of primary compressor bars encircling said stationary shaft within said tank, a pulp gathering former mounted for travel upon said stationary shaft toward the upper end thereof, said pulp gathering former passing through the series of primary compressor bars and through the tank to gather pulp upon said former, a series of final compressor bars above said primary compressor bars, said former traveling through said series of final compressor bars after leaving the primary compressor bars, said primary compressor bars serving to compress pulp gathered upon said former, means for forcing inwardly alternate bars of the series of final compressor bars to further compress and shape the pulp around said former, means for forcing inwardly the remaining bars of said series of final compressor bars upon outward movement of the first mentioned bars of said series, and connections between the first mentioned means and the last mentioned means.

12. In a machine of the class described, the combination with a tank, a shaft extended through said tank, a former traveling upon said shaft, and primary pulp compressor bars movable toward said former; of a series of final compressor bars encircling and arranged concentrically of the shaft and former, alternate bars of said series being provided with lower wedge blocks, the remaining bars of said series being provided with upper wedge blocks, lower and upper cam rings rotatably mounted upon said lower and upper cam blocks, runways outwardly of said rings, said runways having depressed portions with the depressed portions of the upper runway offset from the depressed portions of the lower runway, means carried by said lower and upper rings for engagement in said runways to force inwardly the lower and upper wedge blocks alternately upon rotation of said cam rings, connections between said upper and lower cam rings, a gear ring, said connections being secured to said gear ring, and means for driving said gear ring.

13. In a machine of the class described, the combination with a tank, a shaft extended through said tank, a spiral thread located upon a portion of said shaft below said tank, pulp gathering former-sections engaged around said shaft, means carried by said former-sections to cause interlocking engagement of the same upon said shaft, a gear ring encircling said shaft below said tank, bell-crank levers mounted in said gear wheel, rollers mounted in said bell-crank levers for binding engagement with the outer faces of the former-sections in consecutive order to rotate said former-sections over said thread and cause a steady spiral movement of said former-sections upwardly through said tank, means for resiliently retaining said bell-crank levers in normal position, said means being adjustable, and means for rotating said gear ring.

14. In a machine of the class described, the combination of a pulp containing tank, a pulp gathering former, a stationary shaft extended through said pulp containing tank, said pulp gathering former being mounted upon said stationary shaft for a spiral movement around the same and through said pulp containing tank to gather pulp upon its outer face, primary compressing members for compressing around the pulp gathering former the pulp gathered upon the outer face of the latter and forcing all liquid from said pulp, and final compressing members for further compressing said pulp and shaping the same into a cylindrical structure around said pulp gathering former.

15. In a machine of the class described, the combination of a pulp containing tank, a stationary shaft extended through said pulp containing tank, a spiral guide thread arranged on a portion of said stationary shaft, a sectional former mounted upon said shaft, means for rotating said sectional former over the spiral guide thread and causing movement of said sectional former in a spiral direction around said stationary shaft and through said pulp containing tank to gather pulp upon the outer face of said sectional former, means for compressing the gathered pulp upon said outer face of the sectional former to produce a cylindrical pulp structure, and means for directing hot air to the pulp structure to dry the same upon said sectional former.

16. In a machine of the class described, the combination of a pulp containing tank, a stationary central shaft extended through said pulp containing tank, a pulp gathering and directing receptacle mounted in the bottom of said pulp containing tank and around said stationary central shaft, a vertically movable platform mounted upon the lower portion of said stationary central shaft, a guide thread upon a portion of said stationary central shaft, a pulp gathering former constructed in sections, means for supporting one of said sections in position upon the platform and around said stationary central shaft, said platform being adapted to be raised to engage said section with said guide thread, means for rotating said section upon said guide thread to cause said section to move spirally around said stationary central shaft and through said pulp containing tank, and means for compressing around said section the pulp gathered by the same.

17. A machine of the class described comprising a pulp containing tank, a stationary central shaft extending through said pulp containing tank and having a feed and guide thread formed thereon, a former mounted upon said shaft and adapted to travel over said feed and guide thread and gather pulp upon its outer face while passing through said pulp containing tank, means for compressing the pulp gathered by said former, a circular series of bars for further compressing and shaping the pulp upon said former, a drive shaft, means for operating the compressing means from said drive shaft, means for operating said circular series of bars from said drive shaft, means for directing a drying agent to the compressed and shaped pulp to dry the same upon said former, and means for operating the former from the drive shaft.

18. In a machine of the class described, the combination of a pulp containing tank, a central shaft extending through said pulp containing tank, a sectional former engaged upon said shaft, a series of compressor bars within said pulp containing tank, means for causing an upward spiral movement of said sectional former upon said shaft and through said pulp containing tank, said sectional former gathering the pulp in the pulp containing tank as it passes through the latter, means for operating the series of compressor bars around the former in pairs to press the pulp gathered by the same against said sectional former and squeeze the fluid from said pulp, means for further compressing and shaping the compressed pulp, and means for directing a drying agent against said compressed pulp.

19. In a machine of the class described, the combination with a tank, a shaft extended through said tank, compressor bars around said shaft; of a pulp gathering former mounted for spiral movement upon said shaft and consisting of a plurality of interlocking sections, each section including a longitudinally split outer cylinder and an inner skeleton frame secured in said outer cylinder, and means for causing movement of said pulp gathering former upon said shaft.

20. In a machine of the class described, the combination with a tank, a shaft extended through said tank, and compressor bars around and spaced from said shaft; of a plurality of pulp gathering former-sections for removable engagement around said shaft, a platform mounted upon said shaft, a table rotatably mounted upon said platform to receive and support said former-sections in consecutive order, said shaft having a guide thread formed thereon, each former-section including a sectional inner skeleton frame, an outer cylinder surrounding said sectional skeleton frame, means for preventing rotation of said sectional skeleton frame within said outer cylinder, and a guide nut mounted in said sectional inner skeleton frame for engagement with said guide thread.

21. In a machine of the class described, a pulp gathering former-section including an inner skeleton frame, an outer cylinder formed of perforated material, and a screen mounted upon the outer face of said outer cylinder, said inner skeleton frame being positioned in said outer cylinder, and means for preventing rotation of said inner skeleton frame within said outer cylinder.

22. In a machine of the class described, a pulp gathering former-section including an inner skeleton frame, a sectional outer cylinder formed of perforated material, screen sections mounted upon the outer face of said sectional outer cylinder, means for securing the sectional outer cylinder around the inner skeleton frame and preventing independent movement of said sectional outer cylinder and said inner skeleton frame, and chine and head channel forming hoop sections mounted upon said sectional outer cylinder and serving to secure the screen sections in position.

23. A pulp forming machine comprising a pulp container, a pulp gathering former adapted to pass through said container, and means surrounding the former for progressively pressing pulp against the said former while in the container to force the liquids therefrom.

24. A pulp forming machine having a pulp container, a pulp gathering former movable through said container, means for progressively pressing the pulp against and around the former while in the container to express the liquid therefrom, and means outside the container for further pressing and shaping the pulp upon the said former.

25. A pulp molding machine comprising a pulp containing tank, a perforated former adapted to pass through the tank for gathering pulp thereon, means surrounding the former within the tank for pressing the pulp gathered by the former, for progressively expressing the liquids through the perforated walls of said former against opposite sides thereof simultaneously, and means outside the tank for further pressing the pulp against the walls of the former.

26. A pulp molding machine having a pulp containing tank, a former having a reticulated surface for gathering pulp thereon, a series of pressing members adapted to be brought against the pulp gathered on the former while still in the mass of the pulp, for expressing the excess of liquid from the pulp, and means outside the mass of the pulp for further pressing the liquid from the pulp.

27. A pulp molding machine comprising a pulp containing tank having an opening in the bottom thereof, a pulp gathering former adapted to pass upwardly through said opening and a funnel shaped member surrounding said former at the point where it enters the said tank, whereby pulp will be suitably gathered around the base of the former immediately upon entering the said tank.

In testimony whereof we affix our signatures in presence of two witnesses.

ARTHUR J. HODGE.
HENRY B. RUGGLES.

Witnesses:
R. H. PINNEY,
EDITH C. SALQUIST.